Patented Sept. 10, 1929.

1,728,082

UNITED STATES PATENT OFFICE.

EUGENE SCALES, OF COLUMBUS, OHIO.

PROCESS OF MAKING A WASHING LIQUID.

No Drawing.   Application filed July 3, 1925.   Serial No. 41,873.

This invention relates to a washing fluid and has for its object the provision of a solution which when employed in washing fabrics will remove grease and other foreign matter without injuring the fabrics.

A further object of the invention is the provision of a solution adapted to be employed in washing fabrics and which may be used in combination with ordinary washing soaps, without causing hardening of the soaps and thereby impair the usefulness of the soaps and solution.

This invention will be best understood from a consideration of the following detailed description; nevertheless it is to be understood that the invention is not confined to the disclosure, being susceptible of such changes and modifications which shall define no material departure from the salient features of the invention as expressed in the appended claim.

In carrying out my invention I mix two (2) pounds of commercial sodium carbonate and one-half (½) pound of finely pulverized limestone and nine (9) quarts of water. The water and ingredients are thoroughly stirred and then the water is heated to boiling and maintained at the boiling point for one-half (½) hour. The solution is then removed and cooled and a weak solution of calcium chloride is then added. The solution of calcium chloride is formed by dissolving three (3) ounces of the chloride in three (3) quarts of water. The solution of calcium chloride is thoroughly stirred into the cold solution which was previously prepared. When the combined solutions are at rest after the agitation and the excess of calcium carbonate has settled to the bottom of the container, the liquid is siphoned or drawn off in any approved manner.

The solution thus prepared is now ready for use and predetermined quantities depending upon the degree to which the clothes have been soiled, are added to the water in which the clothes are adapted to be washed and the solution may be employed in the tubs preliminarily to washing or the solution may be added directly to the water in the washing machine.

What I claim is:

A process for the manufacturing of a washing liquid which comprises mixing two pounds of commercial sodium carbonate and one-half pound of finely pulverized lime stone, and nine quarts of water, boiling the mixture for approximately one-half hour, cooling the solution and adding a weak solution of calcium chloride consisting of three ounces of calcium chloride and three quarts of water, thoroughly stirring the calcium chloride solution, then adding a cold solution of sodium carbonate and lime stone and removing the excess calcium carbonate from the solution.

EUGENE SCALES.